3,316,059
PROCESS FOR THE ACID OXIDATION OF LEAD AND ZINC SULPHIDES
Andrew Imre Vizsolyi, Vancouver, British Columbia, and Herbert Veltman, Fort Saskatchewan, Alberta, Canada, assignors to Sherritt Gordon Mines Limited, Toronto, Ontario, Canada, a company of Canada
No Drawing. Filed Oct. 29, 1962, Ser. No. 233,941
3 Claims. (Cl. 23—125)

This invention relates to a process for converting lead and/or zinc sulphides to sulphates. It is particularly directed to providing an improvement in the known process in which finely divided lead and/or zinc sulphide particles are dispersed in an aqueous sulphuric acid solution and reacted with a free oxygen containing gas for the conversion of the contained lead and/or zinc values of sulphate form.

Methods are known for treating lead and/or zinc bearing mineral sulphides for the recovery of the metal values contained therein which involve, as part of the overall process, the oxidation of the sulphides in an aqueous acid medium to form sulphates.

It is known that lead and/or zinc values contained as sulphides in the lead and/or zinc bearing material can be converted rapidly and efficiently to sulphate form by dispersing finely divided particles of the metal bearing material in an aqueous sulphuric acid solution and reacting the resulting slurry with a free oxygen containing gas, such as air, oxygen enriched air or oxygen. Zinc sulphide is converted to zinc sulphate which dissolves in the aqueous sulphuric acid solution. Lead sulphide converts to lead sulphate which is insoluble in the solution and remains with the undissolved residue.

The oxidation reaction proceeds according to the following equations:

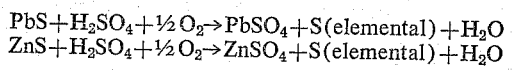

$$PbS + H_2SO_4 + \tfrac{1}{2} O_2 \rightarrow PbSO_4 + S(\text{elemental}) + H_2O$$
$$ZnS + H_2SO_4 + \tfrac{1}{2} O_2 \rightarrow ZnSO_4 + S(\text{elemental}) + H_2O$$

We have found that the acid oxidation of zinc and/or lead sulphides, according to the known aqueous oxidation process described above, is dependent on the presence of oxidizable iron in the mineral sulphides subjected to treatment. The term "oxidizable iron" as used herein is iron which is capable of producing ferrous or ferric ions under the oxidizing reaction conditions described in detail hereinafter. Pyrrhotite, FeS, and marmatite, $(ZnFe)S_x$, are illustrative of such oxidizable iron compounds. Pyrite, $FeS_2$, does not react readily under the described reaction conditions and, thus, is considered as an unoxidizable iron compound, and while it may be present in the mixture subjected to the oxidizing reaction, it takes very little, if any, part in it. We have found that if there is no oxidizable iron present in the slurry subjected to the oxidation reaction, the reaction will not proceed at all; and if there is only a small amount of oxidizable iron present, of the order of less than about 5% by weight iron of the weight of the non-ferrous metals in the starting material, the reaction proceeds so slowly, if at all, as to be impractical for use as a commercial scale operation. The term "substantially free from oxidizable iron" is used herein to designate mineral sulphides which contain less oxidizable iron than that required to promote the oxidation reaction at a commercially practical rate.

We have found further that in the treatment of zinc and/or lead sulphides which are substantially free from oxidizable iron, the rate and the extent of the oxidation of the lead and/or zinc sulphides can be improved by providing in the slurry subjected to the oxidation reaction finely divided particles of iron or an oxidizable iron compound which is capable of dissociating under the reaction conditions to provide ferrous and/or ferric ions in solution. Oxidizable iron values are provided in the slurry in an amount sufficient to raise the total oxidizable iron content of the mineral sulphides being treated to above at least a finite, or measurable, amount and preferably at least above about 5% of the weight of non-ferrous metal or metals or, in other words, at least the equivalent of about 1 gram of iron for each 20 grams of non-ferrous metal or metals present in the zinc and/or lead sulphide containing material.

The method of the present invention is described in detail hereinafter as it is applied to the treatment of zinc sulphides, lead sulphides and mixtures of lead and zinc sulphides.

In the treatment of zinc sulphides and mixtures of zinc sulphides and lead sulphides, it is preferred to disperse the mineral sulphides, preferably of a particle size smaller than about 150 microns, in an aqueous sulphuric acid solution which contains free acid in amount at least sufficient, and preferably from about 5% to 10% by weight excess, of that required to combine with the lead and zinc values as sulphates. The resulting slurry which contains from about 20% to about 50% by weight solids, is reacted at a temperature below the melting point of sulphur, preferably from about 90° C. to about 112° C., with a free oxygen containing gas, such as air, preferably under a partial pressure of oxygen of from about 10 to about 100 pounds per square inch. Under these conditions, provided the slurry contains oxidizable iron in a form which is capable of dissociating to provide ferrous and/or ferric ions in the solution, sulphide sulphur is oxidized to elemental sulphur in the solid state and can be collected as such. Generally speaking, at least about 5% oxidizable iron by weight of the lead and/or zinc content of the starting material is required to promote the reaction at an acceptable rate. Zinc sulphide is oxidized to zinc sulphate which dissolves in the solution. Lead sulphide, if present in the starting material, oxidizes to lead sulphate which is insoluble in the solution and is present in the undissolved residue. The oxidation reaction proceeds rapidly and efficiently. As very little sulphuric acid is formed when this reaction is conducted below the melting point of sulphur, it is necessary to provide it from an extraneous source.

In treating lead sulphides which contain no zinc sulphides, or contain zinc sulphides in amount which does not warrant their recovery, the oxidation can be conducted below the melting point of sulphur, in which case it is necessary to supply free sulphuric acid from an extraneous source in amount at least sufficient to combine with the lead content as lead sulphate. Sulphuric acid is formed in the solution if the oxidation reaction is conducted at a temperature above the melting point of sulphur. Thus, while the optimum oxidation of lead sulphide to lead sulphate is obtained if sulphuric acid is provided in the solution, the reaction will proceed, but more slowly, if no acid is present in the starting solution if the reaction is conducted above about 130° C. according to the following equation:

$$PbS + 2O_2 \rightarrow PbSO_4$$

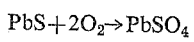

The oxidation of lead sulphide to lead sulphate also proceeds rapidly to substantial completion under the above described conditions provided the starting material contains sufficient oxidizable iron and preferably at least about 5% by weight of the lead and/or zinc sulphides of oxidizable iron or of an iron compound capable of dissociation in the solution to form ferrous and/or ferric ions.

The invention described herein in relation to the treatment of zinc and/or lead sulphides is based on actual observation and is, of course, free of hypothetical considerations. A reasonable explanation of the mechanism of the oxidation reaction is that ferric sulphate is formed in the solution and functions as an "oxygen carrier," being alternately reduced to ferrous sulphate and reoxidized to ferric sulphate until all the sulphide sulphur of the metal sulphide is oxidized to elemental sulphur. The reactions which take place can be expressed by the following equations, where "Me" can be either zinc or lead:

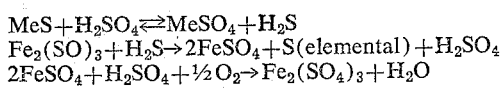

$$MeS + H_2SO_4 \rightleftharpoons MeSO_4 + H_2S$$
$$Fe_2(SO)_3 + H_2S \rightarrow 2FeSO_4 + S(elemental) + H_2SO_4$$
$$2FeSO_4 + H_2SO_4 + \tfrac{1}{2}O_2 \rightarrow Fe_2(SO_4)_3 + H_2O$$

The oxidizable iron may be provided in the slurry subjected to the oxidation reaction in the form of finely divided iron particles or in the form of a compound which is capable of dissociation in the solution under oxidizing conditions to yield ferrous and/or ferric ions. The preferred compounds are ferric oxide, $Fe_2O_3$, pyrrhotite, FeS, and marmatite, $(Zn\ Fe)S_x$. Other compounds such as ferrous sulphate, ferric sulphate, magnetite, $Fe_3O_4$, may also be used but they are less effective. The iron compound can be added in solid form to the feed material, or it can be added in the leach solution as a solid or dissolved in a solvent therefor.

The amount of iron compound added depends, of course, on the initial oxidizable iron content of the starting material and is preferably that amount required to raise the total oxidizable iron content to at least about 5% of the lead plus zinc content of the starting material. For example, there should be a minimum of 1 gram of oxidizable iron for every 20 grams of lead plus zinc in the starting material. There is, of course, no maximum oxidizable iron addition other than that dictated by economic and operating factors. We have found, however, that optimum results usually are obtained when the oxidizable iron content is from about 10% to about 15% by weight of the starting material, preferably about 10%. There is no additional advantage gained by exceeding this amount in most cases.

After the addition of the required amount of metallic iron or iron compound, the process is conducted in accordance with the known method. The oxidation reaction is carried out in a closed reaction vessel, such as an autoclave. If the reaction is conducted at a temperature below the melting point of sulphur, sufficient sulphuric acid is added to provide a pH of below about 2.5 and to provide sufficient free acid to combine with the lead and zinc contents of the sulphides as sulphates. A free oxygen containing gas, such as air, is supplied to the autoclave during the reaction, preferably in amount sufficient to maintain a partial pressure of oxygen above about 10 pounds per square inch. At the completion of the reaction, the leach solution is separated from the residue by a conventional liquid-solids separation, such as by filtration.

The undissolved residue and solution can be separately treated for the separate recovery of the lead and zinc contents.

The following examples illustrate the operation of the present invention:

Example 1

Tests were carried out on samples of lead sulphide concentrates which contained iron and on samples of commerical grade "pure PbS" which were essentially free from iron. The lead concentrate had the following analysis:

| | | |
|---|---|---|
| Pb | percent | 66.2 |
| Zn | do | 1.5 |
| Fe | do | 11.4 |
| S | do | 14.5 |
| Insol. | do | 0.8 |
| Ag, oz./ton | | 25.0 |

This analysis indicates that the iron is present primarily in the form of pyrrhotite, FeS, together with a small amount of marmatite, $(Zn\ Fe)S_x$.

The commercial grade PbS analysed:

| | | |
|---|---|---|
| Pb | percent | 86.8 |
| S | do | 13.1 |
| Fe | | trace. |
| Insol. | | trace. |

In each test, the material was ground in a laboratory pebble mill to about 97% smaller than 75 microns. The starting material was charged into a stainless steel, high pressure autoclave. Sufficient $H_2SO_4$ was added to produce a sulphuric acid to lead molar ratio of 1.05:1. The temperature was maintained at 90° C., and the reaction was continued for 2 hours. Two oxygen partial pressures were maintained, 5 and 20 pounds per square inch. $Fe_2O_3$ was added as the iron compound additive.

The results of these tests are set out in Table I.

TABLE I

| Test No. | 1 | 2 | 3 | 4 | 5 | 6 |
|---|---|---|---|---|---|---|
| Material | Pure PbS | Pure PbS | Pb Conct. | Pure PbS | Pure PbS | Pb Conct. |
| Fe initially present (percent by wt.) | Trace | Trace | 11.4 | Trace | Trace | 11.4. |
| Fe added as $Fe_2O_3$ (percent by wt.) | Nil | 8.7 | Nil | Nil | 8.7 | Nil. |
| $O_2$ pressure (p.s.i.) | 5 | 5 | 5 | 20 | 20 | 20. |
| $H_2S$ observed | Continuous | Start only | Start only | Start only | Start only | Briefly at start. |
| Corrosion observed | Serious | None | None | None | None | None. |
| pH after 2 hrs | Below 0 | 3.2 | 2.1 | Below 0 | 2.9 | 2.3. |
| Pb conversion | About 60% | 90% | 95% | 5% | 94% | 99%. |

The effect of the iron addition to iron free lead sulphides is readily apparent, particularly in comparing test 1 and tests 4 and 5. In test 1, there was serious corrosion of the stainless steel autoclave which introduced some ferrous ions in the solution which in turn promoted the oxidation of a portion of the sulphides. In test 4 where there was no corrosion of the autoclave and thus no ferrous ions introduced, the lead sulphide was essentially unoxidized. Test 2 indicates that improved oxidation of the lead sulphide is obtained when only a trace or a finite amount of oxidizable iron is present in the starting material.

Example 2

Tests were carried out on 3 samples of zinc sulphides:
 (a) Commercial grade "pure" ZnS,
 (b) A low iron zinc sulphide concentrate containing zince primarily in the form of sphalerite,
 (c) A high iron zinc sulphide concentrate containing zinc primarily in the form of marmatite.

The test samples were leached in a high pressure autoclave for 6 hours at a temperature of 112° C. and under an oxygen partial pressure of 20 pounds per square inch. Tests were conducted using various iron compounds to supply the required iron ions.

TABLE II.—ACID OXIDATION OF ZINC SULPHIDE; EFFECT OF THE ADDITION OF IRON ON THE OXIDATION RATES AND ZINC EXTRACTIONS OF VARIOUS ZINC SULPHIDE BEARING MATERIALS

[Conditions: Temperature=112° C.; $O_2$=20 p.s.i.; Time=6 hours]

| Expt. No. | Zinc Sulphide Sources | | | | Iron Added | | Products | | | | | | | Results, Zinc Extraction, percent |
|---|---|---|---|---|---|---|---|---|---|---|---|---|---|---|
| | Starting Material | Analysis (percent) | | | Compound | Fe, g.p.l. | Leach Solution | | | pH | Leach Residue | | | |
| | | Zn | Fe | S | | | Zn, g.p.l. | Fe, g.p.l. | $H_2SO_4$, g.p.l. | | Wt, gms. | Zn | Fe | |
| 1 | Chemically Pure Zinc Sulphide. | 66.9 | Nil | 32.8 | Nil | Nil | 57.0 | 0.2 | 140 | 0.0 | 119.5 | 59.0 | 0.2 | 23.0 |
| 2 | | 66.9 | Nil | 32.8 | $Fe_2O_3$ | 10 | 127.0 | 9.8 | 24 | 0.7 | 42.7 | 13.6 | 0.1 | 93.7 |
| 3 | | 66.9 | Nil | 32.8 | $Fe_3O_4$ | 10 | 79.0 | 9.5 | 90 | 0.0 | 107.0 | 55.3 | 0.2 | 36.2 |
| 4 | | 66.9 | Nil | 32.8 | $Fe_2(SO_4)_3$ | 10 | 90.5 | 11.3 | 65 | 0.5 | 90.0 | 48.5 | 0.2 | 53.2 |
| 5 | Low Iron Zinc Concentrate. | 63.6 | 0.57 | 30.8 | Nil | Nil | 87.0 | 0.34 | 75 | n.r. | 98.0 | 45.0 | 0.6 | 51.8 |
| 6 | | 63.6 | 0.57 | 30.8 | $Fe_2O_3$ | 10 | 135.0 | 6.5 | 2 | 1.4 | 53.5 | 11.2 | 7.2 | 93.5 |
| 7 | | 63.6 | 0.57 | 30.8 | $Fe_3O_4$ | 10 | 130.0 | 7.2 | 3 | 1.4 | 57.7 | 13.4 | 3.9 | 91.5 |
| 8 | | 63.6 | 0.57 | 30.8 | $Fe_2(SO_4)_3$ | 10 | 124.0 | 11.8 | 21 | 0.6 | 48.5 | 10.5 | 0.9 | 94.6 |
| 9 | | 63.6 | 0.57 | 30.8 | $FeSO_4$ | 10 | 122.0 | 10.1 | 22 | 0.5 | 62.0 | 19.7 | 0.8 | 86.8 |
| 10 | High Iron Zinc Conc. | 51.2 | 10.3 | 33.6 | Nil | | 140 | 6.3 | 9 | 1.2 | 88.5 | 2.1 | 13.1 | 98.2 |
| 11 | | 51.2 | 10.3 | 33.6 | $Fe_2O_3$ | 10.0 | 144 | 3.1 | 4 | 1.1 | 108.0 | 3.8 | 22.3 | 95.9 |

The results set out in Table II illustrate that in the absence of oxidizable iron or when the oxidizable iron content of the sulphides is relatively low, only partial conversion of the zinc sulphides to sulphates takes place even after 6 hours reaction time. The results further illustrate that in the treatment of iron free sulphides, the addition of oxidizable iron in the form of $Fe_2O_3$ produces the best results. The results further illustrate that when the sulphide contains a substantial amount of naturally occurring oxidizable iron, 10.3%, the addition of extra iron does not further improve the oxidation of the zinc sulphides.

The process of this invention possesses several important advantages. It enables the economic, rapid and substantial conversion of zinc and lead sulphides to sulphate form when they occur in starting material which contains oxidizable iron in a form capable of producing ferrous and/or ferric ions under reaction conditions in amount less than that required to promote the oxidation reaction, which material, heretofore, could not be treated on an economically practical basis by the aqueous acid oxidation process. The process can be conducted inexpensively in conventional equipment.

What we claim as new and desire to protect by Letters Patent of the United States is:

1. In a process for the oxidation of mineral sulphides substantially free of oxidizable iron which contain values of at least one non-ferrous metal selected from the group consisting of lead and zinc in which the mineral sulphides are reacted at a temperature above about 90° C. but below the melting point of sulphur in an aqueous sulphuric acid solution with a free oxygen bearing gas, the improvement which comprises the step of providing in said aqueous solution from an extraneous source oxidizable iron in amount at least sufficient to provide a total oxidizable iron content in said solution equivalent to about .5% by weight of the lead plus zinc content of said mineral sulphides.

2. The process according to claim 1 in which oxidizable iron is provided in amount equivalent to about 10% to about 15% by weight of said mineral sulphides.

3. The process according to claim 1 in which the added oxidizable iron is provided by the addition to the solution of a member selected from the group consisting of ferric oxide, ferrous oxide, ferric sulphate, ferrous sulphate, pyrrhotite and marmatite.

References Cited by the Examiner

UNITED STATES PATENTS 2,996,440    8/1961    Forward et al. _____ 75—120 X
3,113,860   12/1963    Pagel _____ 75—115

FOREIGN PATENTS 100,488    5/1917    Great Britain.

OSCAR R. VERTIZ, *Primary Examiner.*

MAURICE A. BRINDISI, *Examiner.*

E. C. THOMAS, *Assistant Examiner.*